United States Patent
Walker

(10) Patent No.: US 8,313,708 B2
(45) Date of Patent: Nov. 20, 2012

(54) GAS TREATMENT APPARATUS

(75) Inventor: Paul N. Walker, Bellefonte, PA (US)

(73) Assignee: The Penn State Research Foundation, University Park, PA (US)

(*) Notice: Subject to any disclaimer, the term of this patent is extended or adjusted under 35 U.S.C. 154(b) by 1665 days.

(21) Appl. No.: 11/060,136

(22) Filed: Feb. 17, 2005

(65) Prior Publication Data

US 2005/0217504 A1  Oct. 6, 2005

Related U.S. Application Data

(60) Provisional application No. 60/545,845, filed on Feb. 19, 2004.

(51) Int. Cl.
 A61L 9/00 (2006.01)
 A61L 2/00 (2006.01)
 A47J 37/12 (2006.01)
 B08B 3/00 (2006.01)

(52) U.S. Cl. ........ 422/295; 422/297; 422/300; 422/301; 422/304; 422/307; 99/404; 99/584; 99/483; 99/470; 99/360; 99/518; 134/61; 134/94.1; 134/102.1; 134/105; 134/124; 134/133; 134/137; 134/201

(58) Field of Classification Search .............. 422/1, 26, 422/28, 261, 268, 284, 287, 295, 297, 300–301, 422/304, 307; 99/404, 584, 483, 470–478, 99/360, 518; 134/61, 94.1, 102.1, 105, 124, 134/133, 137, 201

See application file for complete search history.

(56) References Cited

U.S. PATENT DOCUMENTS

| | | | |
|---|---|---|---|
| 887,628 A | 5/1908 | Hall | |
| 2,556,385 A * | 6/1951 | Allan | 99/478 |
| 3,722,401 A * | 3/1973 | Davidson et al. | 99/407 |
| 3,774,524 A * | 11/1973 | Howard | 99/483 |
| 3,880,068 A | 4/1975 | Goodale | |
| 4,092,911 A | 6/1978 | Goodale | |
| 4,338,344 A * | 7/1982 | Brooks et al. | 426/461 |
| 4,547,383 A | 10/1985 | Goldhahn | |
| 4,604,948 A * | 8/1986 | Goldhahn | 99/470 |
| 4,942,810 A | 7/1990 | Zittel et al. | |
| 4,962,777 A | 10/1990 | Bell | |
| 6,086,935 A | 7/2000 | Delrue et al. | |
| 6,153,240 A | 11/2000 | Tottenham et al. | |
| 6,263,785 B1 | 7/2001 | Zittel | |
| 6,311,611 B1 * | 11/2001 | Frenkel et al. | 99/469 |
| 2005/0016388 A1 | 1/2005 | Tyndall | |

* cited by examiner

*Primary Examiner* — Jill Warden
*Assistant Examiner* — Monzer Chorbaji
(74) *Attorney, Agent, or Firm* — Gifford, Krass, Sprinkle, Anderson & Citkowski, P.C.; Douglas L. Wathen

(57) ABSTRACT

An apparatus for treating objects with a treatment gas comprises a treatment chamber, a chamber input through which objects enter the treatment chamber, and a chamber output (which may be the same as the chamber input) through which the objects leave the treatment chamber. The treatment chamber encloses the treatment gas, which can be steam. The chamber output and/or the chamber input include an intermediate medium, such as a liquid, through which the objects pass. The intermediate medium prevents escape of the treatment gas from the treatment chamber and the ingress of external gases into the treatment chamber, while facilitating input of the objects to the chamber, and output of the objects from the chamber.

23 Claims, 6 Drawing Sheets

GAS TREATMENT APPARATUS

REFERENCE TO RELATED APPLICATION

This application claims priority from U.S. Provisional Patent Application Ser. No. 60/545,845, filed Feb. 19, 2004, the entire content of which are incorporated herein by reference.

This invention was made with Government support under Hatch Act Project No. PEN03591, awarded by the United States Department of Agriculture (USDA). The Government has certain rights in the invention.

FIELD OF THE INVENTION

The invention relates to methods and apparatus for treating objects with gases.

BACKGROUND OF THE INVENTION

Gas, in particular steam, treatment of foods and other products is a widespread practice and the growing government and consumer awareness of microbial contamination of foods means the use of steam and other gas treatments will greatly increase. Consumer demand for high quality and a wide variety of foods will also increase the use of such treatments. Better gas treatment systems are needed particularly to provide better treatment, to treat less resilient foods, and to increase profitability. One example of gas treatment is the steam cooking of vegetables. It is conservatively estimated that the current market for the subject gas treatment apparatus is 1,000 units in the U.S. and 10,000 units worldwide for food applications alone. The market for non-food applications is expected to be considerable also.

From a food safety perspective, microbial contamination accounts for more than 90 percent of unconfirmed food-borne illnesses. The Centers for Disease Control (CDC, 1999) estimates 76 million cases of food-borne illnesses, 325,000 of which result in hospitalization and 5,000 in deaths annually because of microbial contamination. The annual cost of these illnesses is approximately $8.4 billion. The portion of that cost which can be attributed to improper commercial processing is not clear but empirical evidence suggests that it is an important contributor.

The invention provides a means of containing the treatment gas in a treatment chamber and also transferring the product into the treatment chamber and then out of the treatment chamber while minimizing the loss of treatment gas and preventing unwanted gases from entering the treatment chamber. Elsewhere mechanical air locks have been used to exclude unwanted transfer of gasses. However, opening of the airlocks allows significant volumes of the treatment gas to escaped and/or significant amounts of gases from external sources to enter the treatment chamber. Using mechanical means alone to exclude transfer of gases is often capital intensive, and the efficacy is less than desirable.

Air or other unwanted gases carried into a gas treatment chamber dilutes the treatment gas, and may otherwise reduce its effectiveness. The introduction of unwanted gases also increases the total mass of the gas and this extra mass may create handling problem to prevent pollution. The treatment gas may also be carried out of the treatment chamber with the product, and, while a certain amount may be beneficial, large amounts are generally problematic because of the cost of replacing the treatment gas and the safety/pollution problems it may pose. Such transfers of air and/or treatment gas are objectionable because they increase the cost or reduce the effectiveness of the treatment. Hence, there is a need for a gas treatment chamber that reduces the escape of treatment gas from the chamber and reduces the introduction of air or other unwanted gases into the treatment gas.

U.S. Pat. No. 887,628 to Hall describes a steaming apparatus having a conveyor belt. However, water or other dense medium is not used to retain the steam in the casing. Similarly, U.S. Pat. No. 6,153,240 to Tottenham et al. describes an apparatus and method for food surface microbial intervention and pasteurization. However, the described method does not include passing the treated object through an intermediate fluid before treatment.

U.S. Pat. No. 3,880,068 to Goodale describes an apparatus for washing and blanching of vegetables, the blanching chamber having a water seal. Other food treatment apparatus are described in U.S. Pat. Nos. 6,263,785 and 4,942,810 to Zittel; U.S. Pat. No. 4,962,777 to Bell; U.S. Pat. Nos. 4,604,948 and 4,547,383 to Goldhahn; and U.S. Pat. No. 4,092,911 to Goodale.

However, the prior art fails to describe an apparatus for treating objects with a treatment gas, the apparatus having a treatment chamber, a chamber input, and a chamber output, the chamber input and chamber output including media through which the objects pass, the media preventing escape of the treatment gas from the treatment chamber and ingress of external gases into the treatment chamber.

SUMMARY OF THE INVENTION

An apparatus for treating objects with a treatment gas comprises a treatment chamber, a chamber input through which objects enter the treatment chamber, and a chamber output (which may be the same as the chamber input) through which the objects leave the treatment chamber. The treatment chamber (at least in part) encloses the treatment gas, for example, steam. The chamber output and/or the chamber input include a dense intermediate medium, such as a liquid, through which the objects pass, the intermediate medium reducing escape of the treatment gas from the treatment chamber, and substantially preventing the ingress of external gases into the treatment chamber.

An improved gas treatment apparatus uses a dense intermediate medium, such as a liquid, to help segregate the air or other unwanted gas from the treatment gas, while allowing easy input and output of objects. There may be a single or multiple gas treatments, separated by a single or multiple intermediate media. A conveyor can be provided to transport objects from the chamber input towards the chamber output. Objects may leave the treatment chamber, for example, by falling through a column of water.

A method of treating objects with a treatment gas comprises providing a treatment apparatus containing (at least in part) a treatment gas within a treatment chamber, transporting the objects into the treatment chamber, the objects passing through a first medium, exposing the object to the treatment gas within the treatment chamber; and transporting the objects out the treatment chamber, the objects moving through a second medium. The objects can be mushrooms, or other food or non-food items. In one example, the treatment gas is steam, and the first liquid and second liquid are both aqueous media such as water.

DETAILED DESCRIPTION OF THE INVENTION

Examples of the present invention include gas treatment apparatus allowing objects to be treated with a treatment gas. In specific examples discussed below, the objects to be treated are mushrooms, and the treatment gas is steam. However, the invention is not limited to these examples.

An intermediate medium, such as liquid water, is used to keep outside gases from entering the treatment chamber. In one approach, an object is moved from a surrounding gas, such as the atmosphere, through the intermediate medium and into the treatment gas. After treatment of the object by the treatment gas, the object is moved back through the same or different intermediate medium and back into the ambient atmosphere, or into some other environment.

In examples below, the unwanted gas is air, the treatment gas is steam, the intermediate medium is water (liquid phase), and the material being treated comprises mushrooms. Mushrooms, either singularly or in plural, are moved from the air environment, optionally through pre-treatments, into the intermediate medium and then into the steam treatment environment. Density differences between the air and the water, and between the water and the steam, keep the air and steam from mixing.

Figure 1:
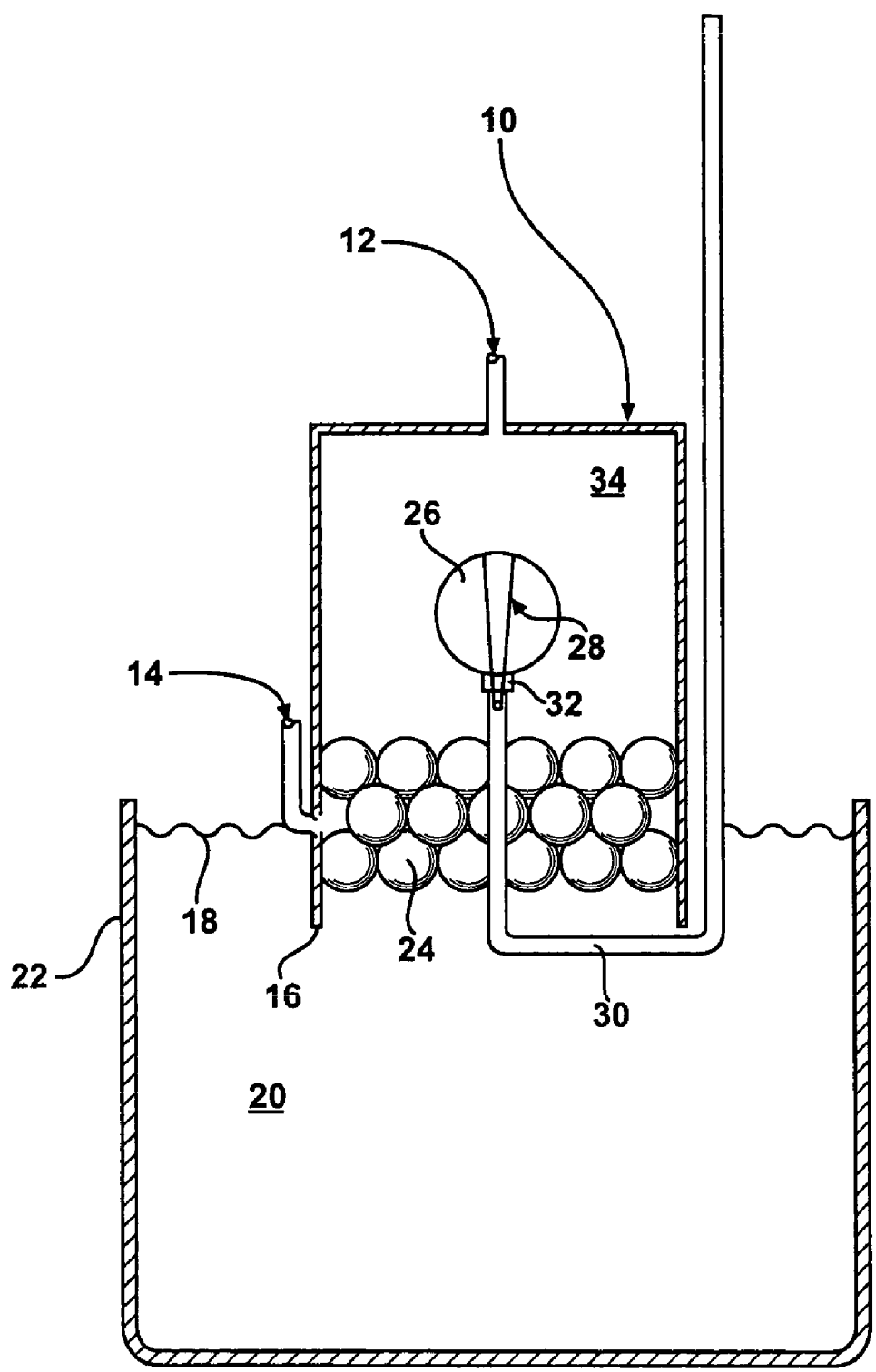
FIG. 1 shows an apparatus for steam treatment of an object.

FIG. 1 illustrates a gas treatment apparatus for a gas treatment of an object. In this example, the intermediate medium is a liquid. The gas treatment apparatus includes a gas treatment chamber 10, having a gas inlet 12, and a gas exit 14. The gas treatment chamber has chamber walls 16, an opening in the chamber walls being submerged beneath the surface level 18 of an intermediate medium 20. In this example, the intermediate medium is a liquid such as water. The liquid is contained in a liquid container 22. A layer of floating spheres, such as sphere 24, is supported by the surface of the liquid within the opening of the gas treatment chamber (and may optionally cover the entire liquid surface). The object to be treated 26 is secured using securing bands 28 to an object support 32 of generally U-shaped holder 30. The holder allows the object to be pushed through the liquid and into the gas treatment chamber 10. The gas treatment chamber 10 contains treatment gas 34 in the volume enclosed by the gas treatment chamber and the liquid surface level. After exposure to the treatment gas 34, the object can be removed from the gas treatment chamber 10 through the liquid 20.

For example, the gas can be steam, and the liquid can be water. An example steam treatment chamber has an opening submerged in the water, the water acting to reduce or prevent the steam from escaping from the treatment chamber and to reduce or prevent air from entering the treatment chamber. Optionally, a layer of floating spheres can be provided on the surface of the water. The layer can be one or more spheres in thickness, and can help reduce dissolution of the treatment gas into the intermediate medium, condensation of the treatment gas on the surface of the intermediate medium, and evaporation of the intermediate medium into the treatment gas. The spheres, or other objects or liquids, can be any convenient size or amount.

A working apparatus, similar to FIG. 1, was constructed. The apparatus comprised a transparent treatment chamber with an opening at the bottom. A steam inlet pipe was located on the top and a steam exit pipe was located on one side near the bottom. The inlet pipe was fed continuously from a steam line and the exit pipe discharged to the atmosphere.

The gas treatment apparatus included a stainless steel vessel for containing the intermediate medium. That medium was water with hollow plastic balls floating on top. The opening of the treatment chamber was submerged in the water with all the plastic balls contained within the walls of the treatment chamber. One at a time, apples and cantaloupes were attached, using a rubber band, to a U-shaped holder and manually inserted through the intermediate medium and into the treatment chamber. The fruit were held in the chamber for a few seconds and then brought back through the intermediate medium, removed from the chamber, and detached from the U-shaped device. The fruit were treated with steam using this apparatus for the purpose of reducing the microbe population on the fruit surfaces. The objects treated may include fruits, vegetables, other plant products, mushrooms, articles of manufacture, and the like.

The opening on the lower side of the treatment chamber is large enough to enable the object to enter the gas treatment chamber. For example, the treatment chamber could resemble an upside-down bucket. Piping can be provided to fill, refill, replenish, and/or flush the treatment chamber with one or more gases.

The intermediate medium container is used to hold the intermediate medium. In this example, the container is large enough to submerge the opening of the treatment chamber and to allow the object to pass through the intermediate medium into the opening of the treatment chamber. In this example, the chamber input and chamber output are the same, provided by a single chamber opening. If the treatment chamber has two or more openings, for example for input and output of objects, separate intermediate medium containers can be used for each opening.

Figure 2:
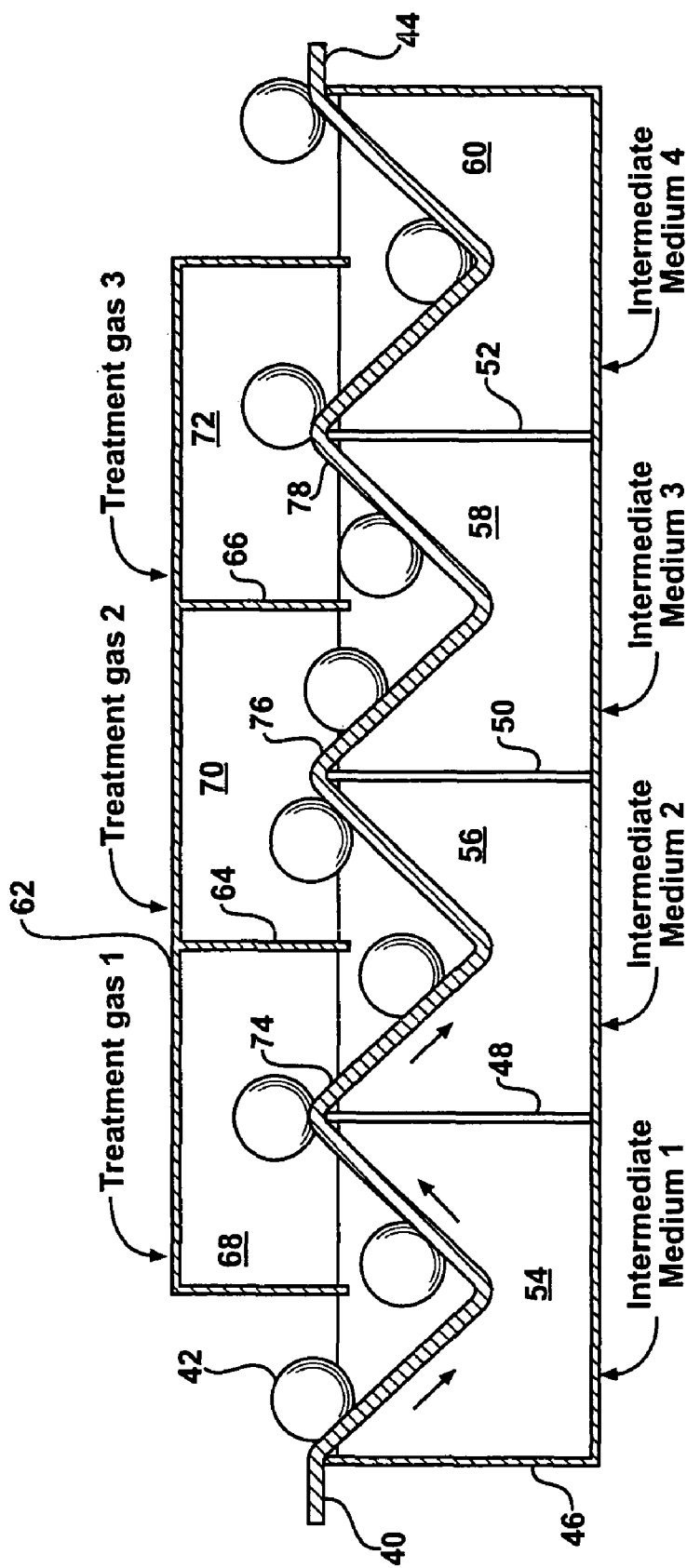
FIG. 2 shows an apparatus for multiple treatments of objects.

FIG. 2 shows an apparatus that allows multiple treatments of an object with multiple intermediate media. The apparatus includes a conveyer 40, the conveyer operating so as to move objects such as object 42 from the inlet end to the outlet end (at 44) of the apparatus. The apparatus includes first, second, third, and fourth intermediate medium containers (formed from outer wall 46 and medium separators 48, 50, and 52) which contain first (54), second (56), third (58), and fourth (60) intermediate media, respectively. First, second, and third treatment gas chambers (formed from outer gas containment wall 62 and gas separating walls 64 and 66) enclose first (68), second (70), and third (72) treatment gases, respectively.

An object, such as object 42, is placed on the conveyer at the inlet end, at the left of the Figure as illustrated, and passes from the ambient atmosphere through the first intermediate medium 54, and then into the first treatment gas 68. The object then passes through the second intermediate medium 56 into the second treatment gas. The object then passes through the third intermediate medium 58 into the third treatment gas 72, and then passes through the fourth intermediate medium 60 into the ambient atmosphere at the conveyor outlet 44. Hence, the conveyor has a plurality of raised portions at 74, 76, and 78, at which the object is exposed to the first, second and third treatment gases respectively.

In this example, the apparatus for treating objects with a treatment gas comprises first, second, and third treatment chambers, each enclosing a treatment gas. The chamber input of the first treatment chamber includes the first intermediate medium, and the chamber output of the first treatment chamber includes the second intermediate medium. The chamber input of the second treatment chamber includes the second intermediate medium, and so on. The intermediate media prevent escape of the treatment gas from the treatment chambers, and the first and fourth intermediate media prevent ingress of external gases into the apparatus.

The ambient atmosphere can be air. The intermediate media can be identical (for example, all intermediate media being water), can all be different (for example, four different aqueous solutions), or can be some other variation.

The conveyer can move the object continuously from one end to the other. The conveyer speed can be reduced, speeded up, or stopped, at one or more stages so as to expose the object for more or less time to a particular treatment gas or intermediate medium.

An apparatus may comprise an input conveyor, to transport objects into a treatment chamber, a treatment conveyor, to transport objects through the treatment chamber, and an output conveyor, to transport objects out of the treatment chamber. A single conveyor can be used for all three situations, or three conveyors used, or some combination of conveyors used which may be the same or different. Conveyors may comprise belts which support the objects, wires on which objects are strung, or other configuration, such as a moving elongated structure (such as a belt, cable, wire, and the like) having attachment mechanisms to engage objects (such as depressions, hooks, and the like).

Multiple gas treatments may require only one intermediate medium, and single treatments may have multiple intermediate media such as one on the inlet and one on the outlet side.

One option not illustrated in FIG. 2 is that the ambient environment on the inlet side of the gas treatment chamber may be different from the environment on the outlet side of the chamber. As an example the inlet environment may be ambient room conditions while the exit environment may be the modified atmosphere of a food package.

Figure 3:
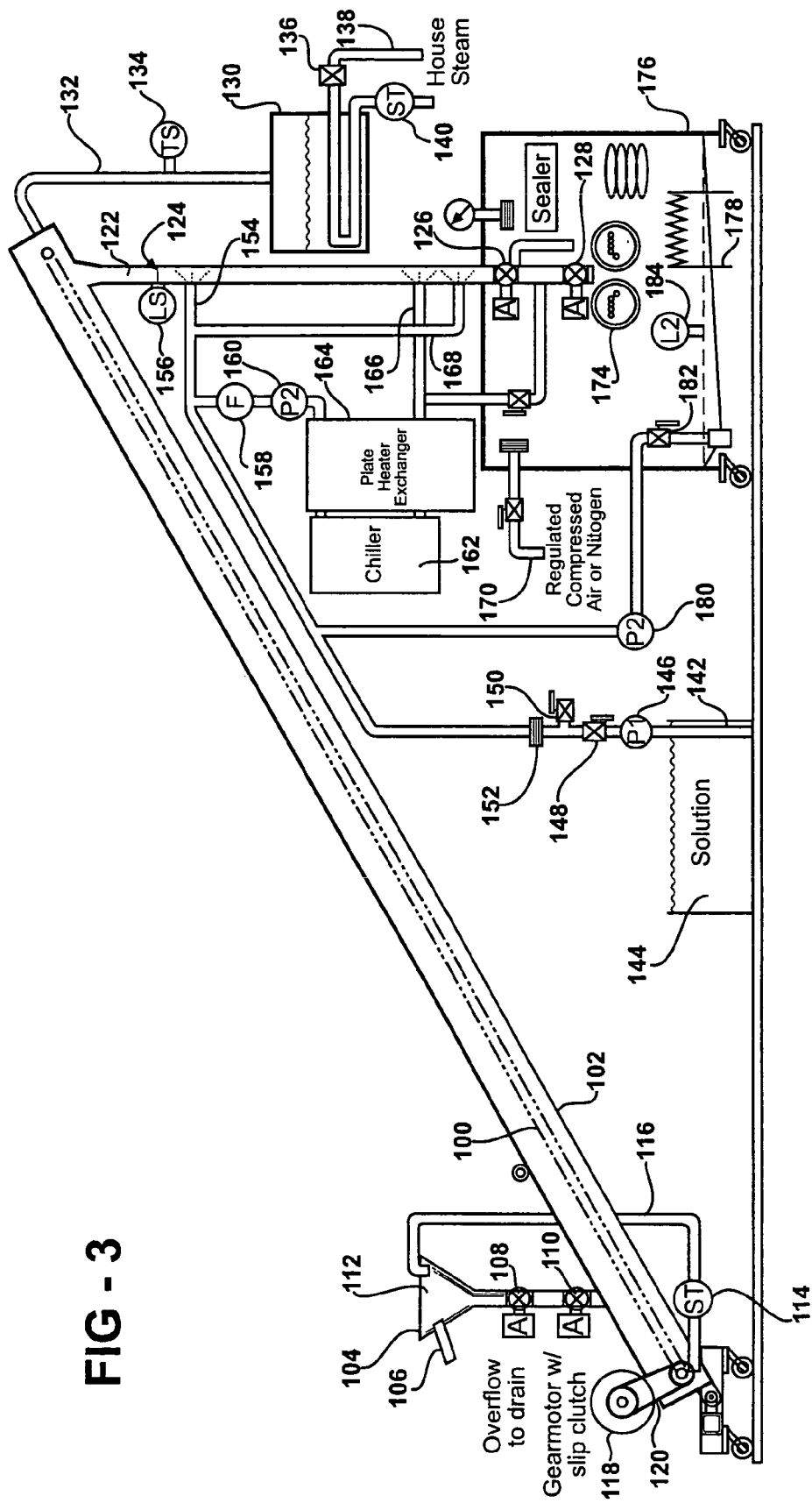
FIG. 3 shows an apparatus for steam treatment of mushrooms and other objects.

FIG. 3 shows the general layout for an apparatus for treating objects with a treatment gas, in this example the steam treatment of mushrooms.

The apparatus includes conveyor 100 enclosed within treatment chamber 102, funnel 104, overflow pipe 106, upper ball valve 108, and lower ball valve 110. The letter 'A' indicated alongside a valve indicates an automated valve, though automation is optional. Objects are placed into the opening 112 of the funnel 104. The apparatus further comprises steam trap 114, water return tube 116, gear-motor 118, drive belt 120, output column (or cooling column) 122 containing water 124, and upper and lower automatic output valves 126 and 128. The treatment chamber receives steam from a steam generator 130, having associated steam supply tube 132, temperature switch 134 electrically coupled to house steam shut off 136 located in house steam supply tube 138, and house steam return trap 140.

The chamber output includes an output cooling system that includes a solution inlet tube 142 bringing an aqueous solution from solution container 144, tubing pump 146, valves at 148 and 150, bacterial filter 152, upper cooling system tube 154, level switch 156 (electrically coupled to pump 146), particle filter (used with mushrooms or other soft objects) 158, magnetic pump 160, chiller 162, plate heat exchanger 164, further tubing such as 166 and 168 used in the circulation system, magnetic pump 180, and valve 182.

The mushrooms exit the apparatus into an aseptic packaging enclosure 176, having associated heater 178, nitrogen or air supply 170, packaging machine represented by glove port 174 operational to package mushrooms in bags, with stacked filled bags represented schematically to the right of the glove port.

In one method of operation, vacuum hydrated mushrooms from a batch process are fed into the funnel 104. The mushrooms, together with water, fall on to the conveyer 100, falling from the conveyor into column 122. Mushrooms fall through a column of water to the automatic valves 126 and 128. Mushrooms, optionally together with water, are packaged within enclosure 176.

The operation of a steam treatment apparatus according to the present invention is described in more detail in relation to FIG. 4 below. The operation of the apparatus of FIG. 3 is similar to that of FIG. 4.

Figure 4:
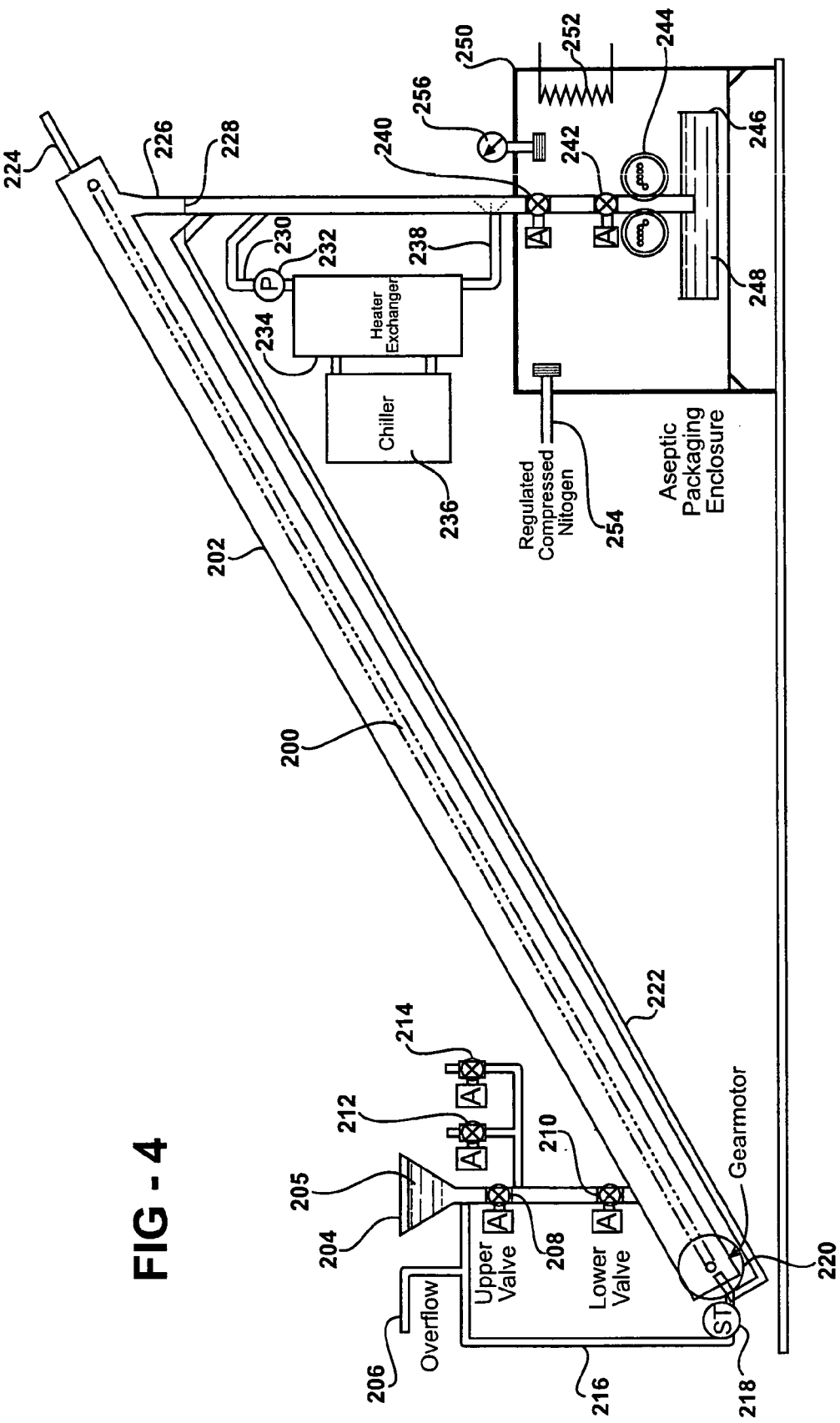
FIG. 4 shows another apparatus for steam treatment of mushrooms and other objects.

FIG. 4 shows the general layout for an apparatus which has been constructed and used to treat objects with a treatment gas. In this example, the treatment gas was pressurized steam, and the objects were mushrooms.

The apparatus includes conveyor 200 enclosed within treatment chamber 202, funnel 204, overflow pipe 206, upper input valve 208, lower input valve 210, pressure release valve 212, pressurized steam valve 214, tube 216, steam trap 218, gear-motor 220, overflow line 222, pressurized culinary steam supply 224, cooling column 226, the cooling column including water having a water level 228, heat exchanger 234, pump 232, cooling tubes 230 and 238, chiller 236, upper output valve 240, lower output valve 242, packaging machine 244, submergence pan 246 holding submergence liquid (water) 248, aseptic packaging enclosure 250, heater 252, nitrogen supply 254, and pressure gage 256. The gage can be used to regulate the compressed nitrogen supply, using a manual or automated method.

The enclosed conveyor 200 runs from the lower left to upper right in the figure, and the treatment chamber 202 comprises an 8-inch diameter tube filled with the treatment gas, pressurized steam from a steam generator supplied through pressurized culinary steam supply 224. Condensate from the steam leaves through the steam trap 218 (symbol ST) shown at the lower end of the conveyor. The conveyor is powered by the gear-motor 220 at the lower end, external to the enclosure.

Objects (in this example, raw hydrated mushrooms) enter the treatment chamber through a chamber input, comprising the funnel 204, and upper and lower valves (automatic ball valves, 208 and 210 respectively) in series. The funnel is filled with water 205, or an aqueous solution, so that only mushrooms, water, and little or no air flows through the valves. Experiments have shown that hot water works best for this application, and as an energy-saving method steam condensate is used as the hot water source, as shown. First, the top valve 208 is opened and closed to allow a slug of mushrooms and water be trapped between the two valves. Secondly, the steam valve 214 (optional) is opened to pressurize the slug with a steam supply, which can preferably maintain pressure at or slightly above the treatment pressure. Thirdly, the lower input valve 210 is opened to allow the mushrooms and water to fall onto the conveyor. The steam valve 214 is then closed, as is the lower input valve 210. The pressure release valve 212 (optional) is then opened and, after a few moments, closed to equilibrate the pressure in the space between the valves to that of the ambient environment. The upper input valve 208 can then be opened again, to enter another slug of mushrooms and water.

The purpose of pressurizing the slug with steam, as described above, is to reduce the turbulence which results when the lower valve is opened, the slug falls onto the conveyor and steam rushes from the treatment chamber, through the lower valve, counter to the flow of the slug, to fill the space vacated by the slug. Supplying a source of pressurized steam above the lower valve reduces the counter flow of steam and helps minimize turbulence and the resulting forces on the mushrooms.

The water that enters the treatment chamber with the mushrooms drains through the conveyor and exits out the same steam trap (218) as the condensate, powered by the steam pressure. Thus, the mushrooms are not submerged in liquid while they are on the conveyor.

The mushrooms are cooked (treated) by the steam (treatment gas) as they are carried to the other end of the treatment chamber (the 8-inch tube) by the conveyor. The treatment time is controlled by the speed and length of the conveyor. The conveyor 200 is shown as inclined at 30 degrees upward, but for many applications no inclination is necessary. At the right end of the conveyor the mushrooms drop into the chamber output, comprising a vertical 3-inch diameter tube cooling column 226. A prototype device was constructed having a conveyor inclination of 45 degrees.

The cooling column contains water or a water solution for cooling the mushrooms. The water has water level 228. This water is kept cool by recirculation through the heat exchanger 234, with the cold fluid for the heat exchanger provided by chiller 236. Additional tubes (such as 230, 238) and pump 232 are also used in the cooling system.

The water also serves a second purpose of submerging the mushrooms upon exit from the system. For mushroom cooking, both functions are useful. The water level 228 is maintained near the top of the tube to take advantage of the tube length for cooling. The water level in the column is such that a top portion is not in the recirculation path. This semi-stagnant layer of water helps form a thermal barrier and reduce heat transfer from the steam to the cooling water. Floating or other thermal barriers also may be used. The water level is kept at the desired location by spilling excess water down the overflow line 222 to the steam trap.

The mushrooms move downward through the cooling column (either by gravity, flow of the solution, or a combination of both) to the upper and lower output valves (two automatic ball valves) located at the bottom of the tube. A slug of mushrooms exits the apparatus by operating the two valves in series, much like the process of object input into the treatment chamber. The exit is submerged in water contained in a submergence pan to minimize the amount of water discharged, and to minimize the amount of air which enters the chamber as the valves are operated.

The exit is surrounded by an aseptic packaging enclosure 250 (optional) filled with pressurized (low gage pressure) sterile nitrogen, provided by nitrogen supply 254. At start-up the enclosure is sterilized using a combination of steam (not shown) and electric resistance heating using resistance heater 252.

Packaging is not shown in the figure. Mushrooms can be manually removed from an exit submergence pan, placed in sterilized jars, with an appropriate amount and type of liquid and then sealed. Any remaining space in the jars can be filled with nitrogen. Nitrogen rather than air is used to help prevent oxidation of the mushrooms. The ability to use nitrogen or another gas, rather than water, to fill the space around the mushrooms is one of the many advantages of this processing technique compared to conventional canning. Alternatively, a second conveyor can be used to remove the mushrooms from the submersion pan, and mechanized packaging used if desired.

The valves at each end of the system can be replaced by pumps or rotary feeders. The two valves were used here because a suitable pump or rotary valve was not available for handling large fragile particles (mushrooms) at the appropriate flow rate. The device shown was designed to be used with vacuum-soaked mushrooms. Vacuum-soaking is done for economic and quality reasons, but it also makes the mushrooms denser than water. Thus, the system shown is designed to operate with a product denser than water. A modified, but fundamentally similar, design would be used for less dense products.

Experiments on aseptic processing of mushrooms produced an aseptic product, showing that the system can be operated under sterile conditions. Furthermore, the mushrooms were packaged with minimal liquid and having good color. The temperature in the treatment chamber was uniform from one end to the other, and the mushrooms were heated rapidly.

The cooling column can prevent damage to the treated objects when the gas treatment uses elevated temperature and pressure. For example, steam treatment conditions for mushrooms can be 120° C. steam temperature, with corresponding steam pressure. If the mushrooms are removed to the normal atmospheric pressure without cooling to below 100° C., some the liquid water inside the mushroom will flash to steam and puff the mushroom. The cooling column allows cooling of the objects while the objects remain under pressure. The intermediate fluid may be used for cooling or there may be a separate fluid for that purpose. In other examples, puffing of objects may be desirable, such as using cereal grains such as rice as the objects.

Hence, in this example, an apparatus for treating objects with a treatment gas (steam) comprises a treatment chamber enclosing the treatment gas, a chamber input through which the objects enter the treatment chamber, the chamber input including an input medium (water or other aqueous medium) through which the objects pass when entering the treatment chamber, and a chamber output through which the objects leave the treatment chamber including an output medium (water or other aqueous medium) through which the objects pass when leaving the treatment chamber. Both the input medium and output medium substantially reduce, in fact largely prevent, ingress of external gases into the treatment chamber as the objects enter the chamber, and also reduce escape of treatment gas from the treatment chamber. In this example, the chamber input and chamber output both comprise a water filled column having two sequentially operated valves, though the valves are optional.

Figure 5:
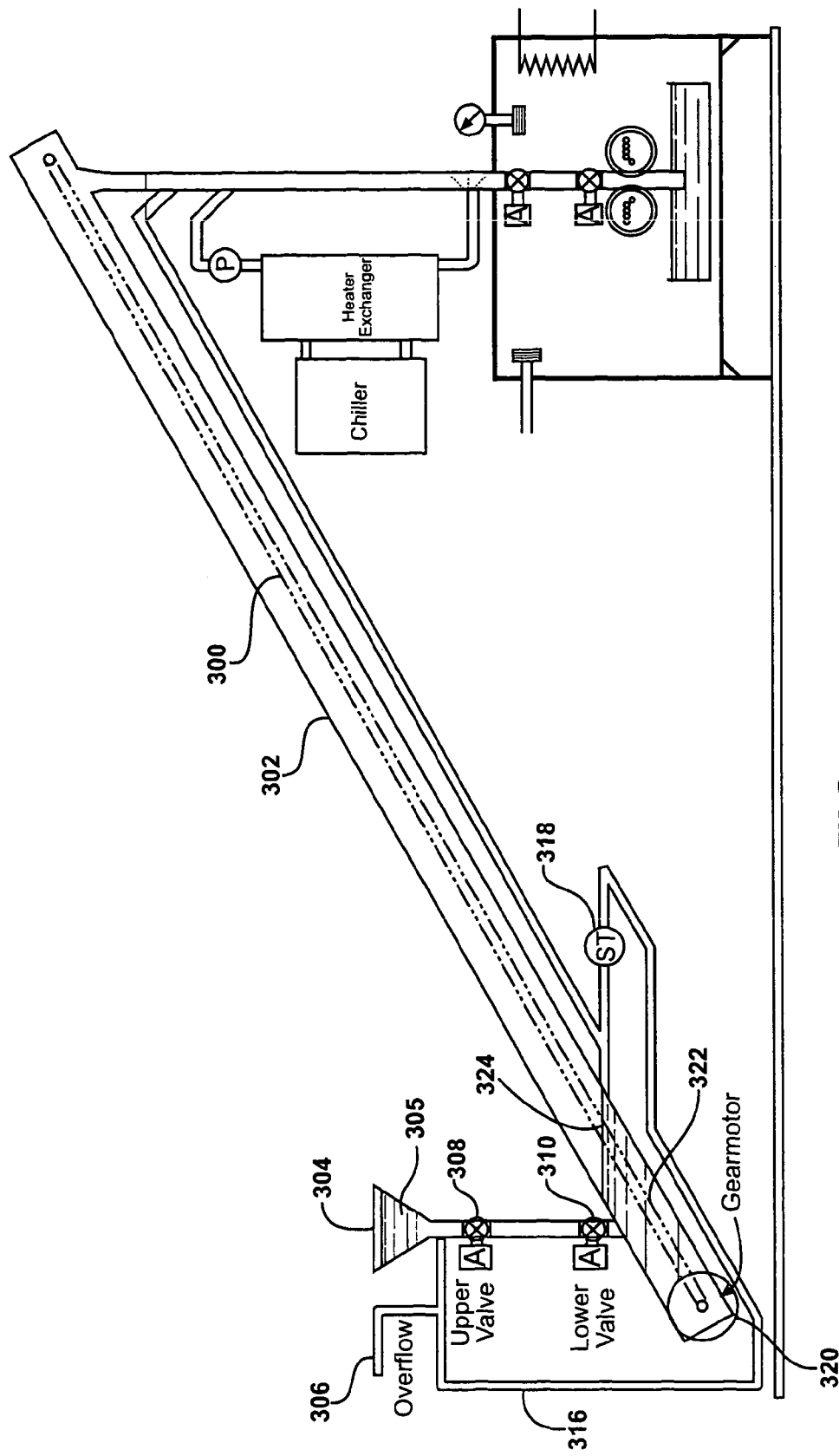
FIG. 5 shows an apparatus in which part of the gas treatment chamber is fluid filled, objects to be treated dropping into the fluid.

FIG. 5 shows a modified version of the apparatus discussed above in relation to FIG. 4. The apparatus comprises conveyor 300 enclosed within treatment chamber 302, funnel 304, overflow pipe 306, upper and lower input valves (ball valves 308 and 310), tube 316, steam trap 318, and gear-motor 320. Other features are similar to the apparatus discussed above, and are not discussed here. The lower end of the treatment chamber contains water 322, with water surface level shown at 324. The figure also shows water 305 in the funnel 304.

The overflow can also be positioned so that that all water passing through pipe 316 (including any overflow) flows through the funnel, to keep the funnel water hotter. For example, an overflow pipe may be positioned to connect to just below the base of the funnel, opposite the opening of pipe 316.

In this configuration, the mushrooms are still submerged after being dumped into the treatment chamber. This reduces mechanical stress on the mushrooms created by the turbulence associated with dumping the slug of water and mushrooms directly into the pressurized steam environment.

The cooling columns shown in FIGS. 3-5 have a zone in which the fluid is kept cool. Additionally there is a zone above that which is kept approximately stagnant, although some mixing does occur as objects pass through it, or resulting from induced currents from circulation of the cooling water below.

If hot treatment gas is used, the top of the stagnant zone is in contact with the gas, and the gas heats the fluid, decreasing the density of the fluid and helping keeping the stagnant layer on top. This effectively insulates the cool fluid from the treatment gas. This insulating density stratification feature could be augmented or replaced by using a layer of oil, floating powder, floating spheres, or the like. Effectively, this insulation works by reducing convective heat transfer and radiation heat transfer, leaving mainly conductive heat transfer. Proper selection of materials for the density stratification layer can also reduce conductive heat transfer. Density stratification insulation can also be used at the inlet. However, in experiments with mushrooms, loss of heat at the inlet was reduced by keeping the inlet fluid hot, though density stratification may also be a factor in configurations of FIGS. 5 and 6.

Figure 6:
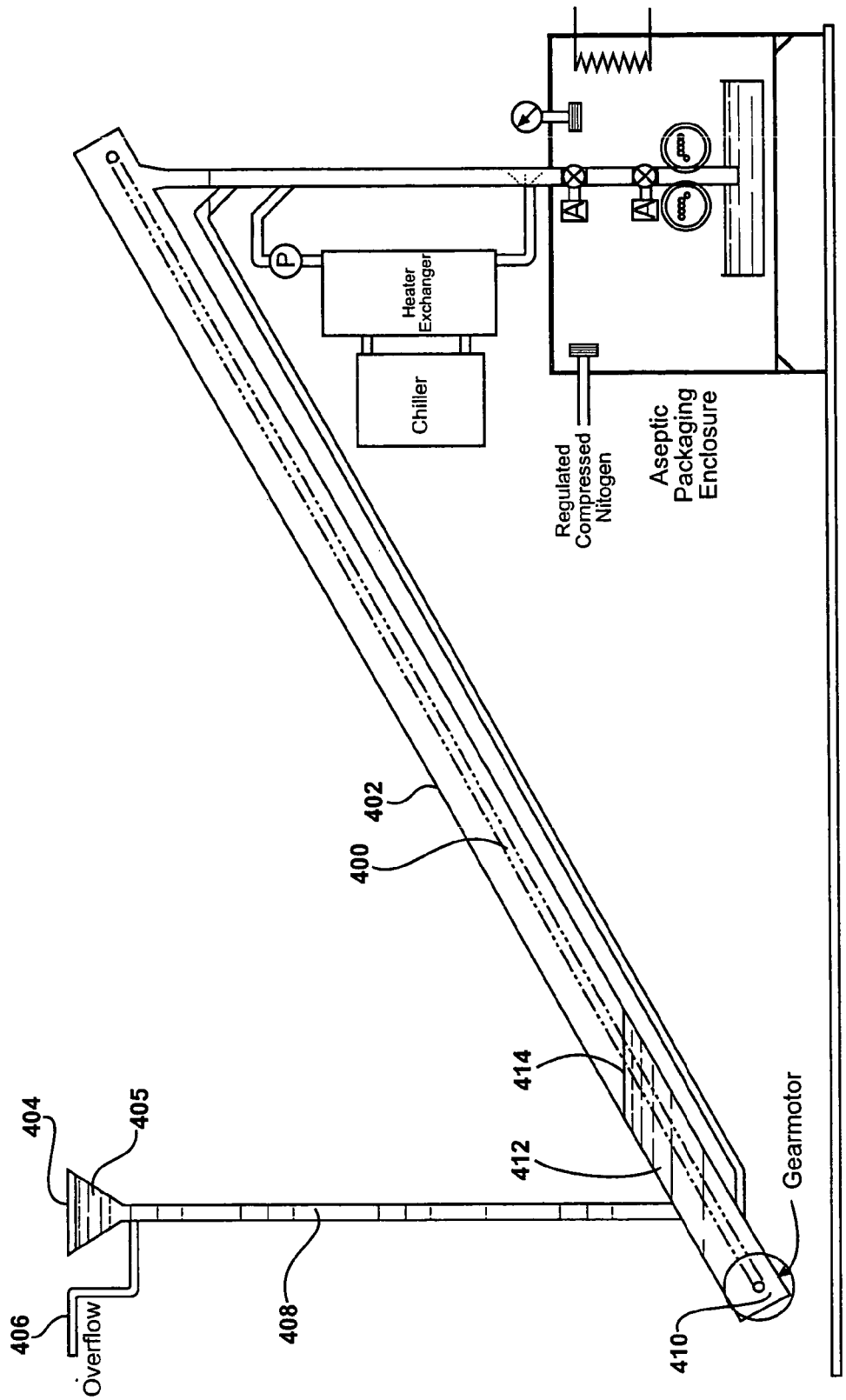
FIG. 6 shows an apparatus not requiring an input valve configuration.

Apparatus according to the present invention allow the use of pressurized treatment fluids, such as pressurized treatment gases. For example, in FIGS. 3, 4, and 5, valves (or pumps or other devices to control pressure difference) are integrated with the inlet and outlet fluids to control pressure, while FIG. 6 illustrates that no such mechanical devices are needed for the inlet. The outlet could be configured similarly.

In the example systems shown, the steam is generated externally (using steam generator) and the cooling fluid is kept cool externally (using heat exchanger and chiller). However, these functions can be accomplished internal to the treatment chamber and cooling column, respectively.

The inlet and outlet fluids can each be layers of different materials, or layers of the same material.

FIG. 6 shows another modified version of the apparatus discussed above in relation to FIG. 4. The apparatus comprises conveyor 400 enclosed within treatment chamber 402, funnel 404, overflow pipe 406, input column 408, and gearmotor 410. Other features, to the right in the figure, are similar to the apparatus discussed above in relation to FIG. 4, and are not discussed here. The lower end of the treatment chamber contains water 412, with water surface level shown at 414. The figure also shows water 405 in the funnel 404. This example shows a chamber input including a column of liquid to contain the steam pressure, illustrating that valves or a pump are not required for input of mushrooms into the apparatus.

Similarly, the apparatus could be configured so that no valves or pumps are required at the outlet, including when the treatment gas is pressurized steam. The chamber input and chamber output may both comprise liquids providing hydrostatic seals to the treatment chamber.

Steam Treatment

The treatment of foods with steam can substantially reduce microbial populations. Short cooking times can reduce the population on the surface of the food, while longer cooking times reduce the population throughout the food mass. Example food items that could be treated include mushrooms, other vegetables, meat, poultry, fish and fruit.

Apparatus and methods according to the present invention can be used to treat food (such as beef) with steam. The beef (whole or part carcasses, cuts, or processed meat) is placed in the steam environment for a short period of time and then removed. A continuous conveyor can be used to carry the beef into a steam tunnel and then out. The highest bacterial population is on the surface of the beef and so it is desirable to have a high heat transfer rate so the surface of the beef is heated to a high temperature while limiting the depth of heat penetration to minimize cooking. It is, therefore, desirable to minimize the amount of air from being carried with the beef into the steam environment because the presence of air lowers the heat transfer rate. Steam can also be used to treat other food products. Atmospheric pressure saturated steam at approximately 100° C. is satisfactory for controlling some microbial populations while higher temperature normally associated with pressurized steam is required for others.

Construction and use of gas treatment apparatus according to the present invention allows minimizing of the amount of an unwanted gas (e.g. air) from entering the treatment chamber and/or minimizing the amount of treatment gas (e.g. steam) that is lost from the treatment chamber. The objects to be treated can be routed through an intermediate medium of higher density than both the unwanted gas and/or treatment gas.

OBJECTS TREATED AND TREATMENTS PROVIDED

The objects which may be treated by an apparatus according to the present invention include food products, such as fruits, vegetables, meat (such as beef, poultry, and processed meat products such as hot dogs), eggs, fungi such as mushrooms and truffles, other plant products, and other food products. Objects which may be treated also include non-food products, such as articles of manufacture, such as metal objects, semiconductor devices, medical devices, and the like. Other examples are discussed elsewhere. Apparatus according to the present invention can be used for sterilization of objects, chemical processing, coating, cleaning, and other processes.

Examples have been described in which a gas treatment chamber can be used for steam treatment of fruit for the purpose of reducing microbial populations on the fruit surface, and for the cooking of objects such as mushrooms.

However, treatment chambers according to the present invention can also be used for many other purposes, such as treatment (for example, with steam) of objects of biological origin, such as food products, such as fruits, vegetables, meats (such as poultry and hot dogs), cereals (such as rice, corn, or wheat), other grains, legumes (such as peas, beans, and lentils), and other food products. Apparatus can also be used for treatment of non-food products such as articles of manufacture. Apparatus may also be used for treatment of the objects with other gases other than steam, such as hydrogen peroxide vapor, acetic acid vapor, refrigerant gases, etc.

The purposes of such gas treatments can include thermal (cooking, cooling, blanching, pasteurization, and the like), chemical (reactions, processing, pasteurization, etc.), biochemical, and microbiological (pasteurization, sterilization, pathogen destruction, etc.). Steam treatment (or other treatment) can also be useful as part of a process for peeling, pitting, or otherwise processing fruits, vegetables, and the like. Regarding non-food items, purposes can include metallurgical processing, coatings, or other purposes such as those discussed below.

Gas treatments can be combined with other one or more other treatments, for example heat treatment, irradiation (with electromagnetic, ultrasound, nuclear, particles, or other radiation), electric discharges, magnetic fields, electrostatic fields, mechanical agitation, pressure treatment, bubble generation, and the like.

Methods and apparatus described herein can be used as part of numerous engineering, chemical, biochemical, biological, biophysical, physical, and manufacturing processes.

These include processing and treatment of materials (such as alloying, hardening, coating, painting, defect removal, sintering, defect removal, and the like), chemical synthesis (such as synthesis of inorganic chemicals such as oxides, other salts, phosphors, chemical coatings, semiconductors, or superconductors), biochemical synthesis and processing, fabrication and/or processing of device components (such as superconductors, silicon wafer processing, fiber growth and processing, lithographic processing, and the like), photographic chemical processing, crystal growth, semiconductor growth, and the like.

In other approaches, the object may induce a desired chemical change in the treatment gas and/or intermediate medium, for example for decontamination of gases or liquids for environmental purposes.

Objects can be conveyed individually through a treatment chamber, in batches, or in some continuous form such as a tape or rod, or in any convenient manner.

Treatment Gases

Treatment gases used can include steam, hydrogen peroxide vapor, ozone, an organic vapor, or a mixture of gases. If steam is used, a continuous or semi-continuous supply can be used to accommodate condensation on the object and the surrounding environment, including the intermediate medium. Steam usage can be reduced by insulating the surrounding environment.

Treatment gases can include oxides (such as carbon dioxide), oxidizing agents (such as chlorine dioxide, hydrogen peroxide and other peroxides), ozone, halogens (such as chlorine), halogen compounds, acids (such as acetic acid), reducing agents, radioactive gases, inert gases (such as nitrogen), disinfectants, and the like. Treatment gases can be provided at a predetermined temperature, for example as a hot inert gas, or refrigerant gas. However, these examples are not intended to be limiting, as other treatment gas or gases can be used. A treatment gas may also contain a component that catalyzes a reaction or otherwise enhances the effect of another component.

Transporting Objects

Various methods can be used to transport an object from the ambient atmosphere, through the intermediate medium, into the treatment gas, and back into the same or different intermediate medium. Approaches include the use of conveyers, robot arms, manually operated devices, gravity feeds, flowing liquids, kinetic energy, and the like. For example, this can be done manually using a U-shaped device with the object held at the end of one leg of the U while the other leg is manually supported. Conveyors may be used, particularly for commercial production.

Intermediate Medium

The intermediate medium can be a medium having a density much greater than that of the ambient atmosphere and treatment gas. The intermediate medium can greatly reduce the escape of the treatment gas from the treatment chamber, and reduce the amount of ambient atmospheric gas brought into the treatment chamber with the treated objects.

An intermediate medium can be a liquid (such as water, aqueous solution, oil, or emulsion), semi-liquid, powder, gel, particulate material. In other examples, the intermediate medium can be a fluid, such as a denser-than-air gas held by gravity within a depression, a lighter-than-air gas contained within a cap structure, supercritical fluid (such as supercritical carbon dioxide), or other medium with fluid properties such as a particulate or granular medium. The intermediate medium may include one or more distinct components or layers, such as particles floating on a liquid.

If a gas treatment chamber has separate input and outputs, the output intermediate medium and input intermediate medium can be the same or different, and each may comprise one or a plurality of different components, for example selected from gases, liquids, powders, spheres, and the like.

If the intermediate medium is colder than the treatment gas, condensation of the treatment gas on the intermediate medium may be a problem. Similarly, evaporation of the intermediate medium into the treatment gas may be a problem under certain temperature conditions. To help prevent condensation and evaporation problems, or for other purposes, floating spheres can be disposed on the surface of the intermediate medium. The surface of an intermediate medium can also support surfactants, other floating objects, or one or more layers of other fluids (such as a second intermediate medium supported by the first intermediate medium). Additives (such as water additives) may be helpful to reduce any liquid film that may cover the object during treatment.

The intermediate medium may also be used for cooling, quench cooling, heat treatment, hardening, or otherwise changing the physical properties of the object. In other examples, the intermediate medium may further interact with the object, for example by fixing, slowing, or making permanent a chemical change, slowing or stopping a chemical reaction, or slowing, stopping or inducing a some other process. The intermediate medium can be filtered, sterilized, recycled, replenished, heated, cooled, and/or otherwise processed on a continuous basis or at intervals.

The intermediate medium can be any aqueous medium, such as water (which may be distilled water), or water-based solutions such as salt solutions, acidic solutions, detergent solutions, and the like.

Ambient Atmosphere

The ambient atmosphere surrounding the treatment chamber may be atmospheric air, an inert gas, other gas, or other fluid. An object may be placed into an apparatus from a first ambient atmosphere (such as normal air), and emerge into another ambient atmosphere (such as a sterile, filtered, and/or inert gas such as nitrogen). The output of the apparatus may be into a controlled atmosphere for packaging of the treated objects, for example, an oxygen-free, pathogen-free, or moisture-free atmosphere. In other examples, objects may be output into a fluid, the objects being taken away surrounded in the fluid (for example, as canned or other packaged food).

OTHER EXAMPLES

Apparatus according to the present invention can be used to treat objects with a treatment fluid, such as a treatment liquid or treatment gas. For example, a treatment fluid may be an aqueous solution (such as an inorganic acid solution), an organic solvent (such as acetone, ether, ethanol, or other solvent), or other liquid, and the intermediate medium can be a second liquid, such as a liquid immiscible with the treatment liquid. The intermediate medium may also comprise a gas stream, or other fluid acting to contain the treatment fluid (such as a gas, such as steam) within a treatment chamber, and/or to exclude external contaminants from the treatment fluid.

The apparatus can be used for sterilizing genetically modified organic material such as mushrooms, for example as part of a process to extract protein from such organic material.

Apparatus according to the present invention may be combined with other processing equipment, for example to allow further processing of objects leaving the apparatus. For example, a gas treatment apparatus for food may be combined with a food processor, chiller, refrigeration unit, or other equipment.

The apparatus may further allow radiation to be incident on objects within the treatment chamber, or elsewhere within the apparatus, for example microwaves, other electromagnetic radiation (such as radio, IR, optical, UV, or x-ray), nuclear radiation, ultrasound, or other radiation. For example, microwave radiation may be used to further heat food items, and nuclear radiation can be used to further sterilize food items. Radiation can also be used in spectroscopic evaluation of objects as they pass through the apparatus. Radiation can be provided by a radiation source within the chamber, or through appropriate windows.

Hence, a gas treatment apparatus according to an example of the present invention provides a low cost and effective way to treat objects with a gas. It does a better job of excluding air from being carried in with the object (and preventing the treatment gas from being carried out with the object) than do traditional steam-tunnel-like designs, and it is less capital and energy intensive than the use of vacuum for removing air.

Advantages of the described gas treatment apparatus and methods can include: effective exclusion of air from the treatment gas, effective exclusion of treatment gas from air, low energy costs, low capital costs, low treatment gas losses, improved product quality, high reliability and worker safety, and reduced pollution.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Provisional Patent Application Ser. No. 60/545,845, filed Feb. 19, 2004, is incorporated herein in its entirety.

Having described our invention, I claim:

1. An apparatus for treating objects with a treatment gas, the apparatus comprising:
   a treatment chamber, enclosing the treatment gas;
   a chamber input through which the objects enter the treatment chamber,
   the chamber input including an input passage,
   the input passage having an input medium disposed therein through which the objects pass when the objects enter the treatment chamber,
   the input medium substantially reducing ingress of external gases into the treatment chamber as the objects enter the treatment chamber,
   the input passage including a non-hydrostatic device, the objects being submersed in the input medium as the objects pass through the non-hydrostatic device; and
   a chamber output through which the objects leave the treatment chamber,
   the chamber output including an output passage,
   the output passage having an output medium disposed therein through which the objects pass when the objects leave the treatment chamber,
   the output medium substantially reducing ingress of external gases into the treatment chamber as the objects leave the chamber,
   wherein the input medium and the output medium are both liquids.

2. The apparatus of claim 1, wherein the input medium is an aqueous medium.

3. The apparatus of claim 1, wherein the output medium is an aqueous medium.

4. The apparatus of claim 1, wherein the input medium and the output medium are aqueous media.

5. The apparatus of claim 1, wherein the treatment gas is steam, and the input medium and the output medium both comprise liquid water.

6. The apparatus of claim 1, wherein the objects leave the treatment chamber by falling through the output medium.

7. The apparatus of claim 1, wherein the apparatus further comprises a conveyor, the conveyor operable to transport objects from the chamber input towards the chamber output.

8. The apparatus of claim 7, wherein the conveyor is enclosed within the treatment chamber.

9. The apparatus of claim 7, wherein the conveyor further transports objects through the chamber output, the objects passing through the output medium.

10. The apparatus of claim 7, further comprising a conveyor speed control, the conveyor speed control being adjustable to change a treatment time during which the objects are exposed to the treatment gas.

11. The apparatus of claim 1, wherein the chamber input comprises an input aperture submerged below a surface level of the input medium.

12. The apparatus of claim 1, wherein the chamber output comprises an output aperture submerged below a surface of the output medium.

13. The apparatus of claim 1,
    wherein the chamber input and chamber output are located at opposite ends of the treatment chamber.

14. The apparatus of claim 1, wherein the output medium or input medium comprises a liquid, the liquid supporting a layer of floating objects, the objects passing through the liquid and the layer of floating objects.

15. The apparatus of claim 1, wherein the chamber output comprises a liquid-filled column having an exit aperture, the exit aperture being submerged in a submersion fluid contained in a submersion pan.

16. The apparatus of claim 1, wherein the chamber output comprises a columnar tube enclosing the output medium,
    the output medium having a stagnant portion proximate to the treatment chamber, the stagnant portion being heated by the treatment gas, and a cooled portion below the stagnant portion.

17. The apparatus of claim 1, wherein the non-hydrostatic device is a mechanical pressure control device.

18. The apparatus of claim 17, wherein the mechanical pressure control device includes a valve, a pump, or a rotary feeder.

19. The apparatus of claim 1, the output passage including an output non-hydrostatic device,
    the objects being submerged in the output medium as the objects pass through the output non-hydrostatic device.

20. The apparatus of claim 19, the output non-hydrostatic device being a mechanical pressure control device.

21. An apparatus for treating objects with steam, the apparatus comprising:
    a treatment chamber, enclosing the steam;
    a chamber input, including an input passage through which the objects enter the treatment chamber;
    a chamber output, including an output passage through which the objects leave the treatment chamber; and a mechanism for transporting objects from the chamber input to the chamber output, the input passage including an input aqueous medium through which the objects pass when entering the treatment chamber, the input passage including a non-hydrostatic device, the objects being submerged in the input aqueous medium as the objects pass through the non-hydrostatic device, the output passage including an output aqueous medium through which the objects pass when leaving the treatment chamber, the input aqueous medium and the output aqueous medium substantially preventing ingress of external gases into the treatment chamber.

22. The apparatus of claim 21, further comprising a conveyor, the conveyor supporting the objects after the objects enter the treatment chamber and transporting the objects towards the chamber output, the conveyor being enclosed within the treatment chamber.

23. The apparatus of claim 21, wherein the chamber output includes a column of the output aqueous medium through which the objects fall.

* * * * *